M. LACHMAN.
TUBULAR SPOKE WHEEL.
APPLICATION FILED MAY 31, 1919.

1,378,038.

Patented May 17, 1921.

INVENTOR
Maurice Lachman
BY
ATTORNEYS

UNITED STATES PATENT OFFICE.

MAURICE LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

TUBULAR-SPOKE WHEEL.

1,378,038. Specification of Letters Patent. Patented May 17, 1921.

Application filed May 31, 1919. Serial No. 301,023.

*To all whom it may concern:*

Be it known that I, MAURICE LACHMAN, a citizen of the United States, and a resident of New York, in the county of New York and State of New York, have invented certain new and useful Improvements in Tubular-Spoke Wheels, of which the following is a specification.

My invention relates to the construction of metal wheels wherein the rim and spokes are integral.

The object of my invention is to permit the use of ordinary commercial forms of channel bar or beam in the construction of a wheel of the character mentioned by utilizing the side of a bar or beam as the tread or rim and the floor or bottom of the channel bar as the spokes or web part of said wheel.

In carrying out my invention I take a section or suitable length of channel bar sufficient to constitute, by its edge, the rim of the wheel and cut or slit the floor or base of the beam transversely to the edge to form it into divisions suitable for use as the spokes of the wheel when the divided bar or beam is bent in such manner that the edge will form the circular rim and the extreme ends of the divisions, designed for the spokes, will be caused to converge in the hub part at their extremities.

In carrying out my invention it is preferable to divide the base or floor of the channel bar inwardly from both edges to permit the utilization of each edge as the rim or part of the rim of the wheel.

My invention consists essentially in a construction of wheel having the characteristics above stated and further consists in the improved form of wheel wherein two sections of channel bar, prepared as above stated, are placed back to back and secured together so that the rim of the wheel will be formed of the sides and the spokes will be formed of the divided portions of the floor or base of two channel bars or portions of channel bar, the two sections of bar being suitably welded or otherwise secured together to hold them in fixed relation in the completed wheel.

My invention further consists in a construction of wheel from two sections or lengths of channel bar bent, as before stated, as to their edge, and having the integral spokes of the wheel consisting of the divisions of the floor stamped to form longitudinal grooves, said divisions, in the assembled wheel, meeting edge to edge to make in effect a tubular spoke.

Figures 1, 2:
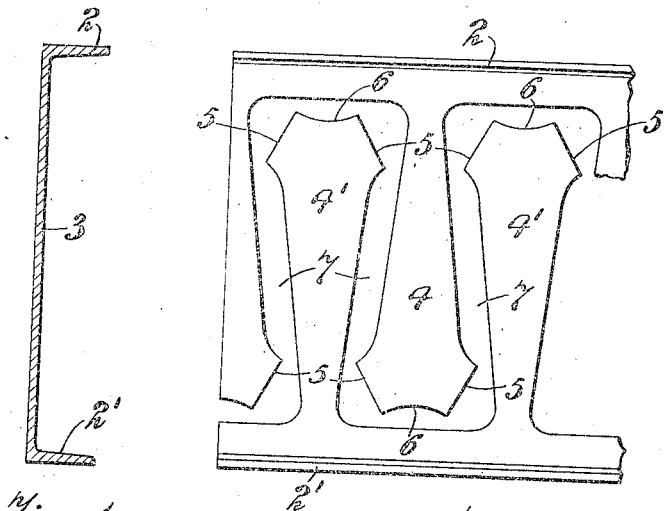
Figure 1 is a cross-section of a channel bar or beam suitable for use in carrying out my invention.
Fig. 2 is a side elevation of a section or portion of said bar suitably cut or slit in its floor or base for forming the wheel by bending the edges into the circumference of the rim and thereby bringing the divisions of the floor or base into suitable assembly or relation at the hub part of the wheel.

Referring to Fig. 1, I have shown a section of channel or U bar or beam suitable for use in carrying out my invention. To construct the wheel from such a section of bar a length thereof is taken sufficient to provide in the flange or edge 2 or 2' a length preferably sufficient to embrace the whole circumference of the wheel when said flange or edge is bent around to form said rim. The base or floor part 3 is then cut or slit to provide the spokes 4 as shown in Fig. 2, said spokes 4 extending from and being integral with the one edge or flange 2 while similar spokes 4' extend from the flange or edge 2', thus utilizing both edges of the bar in the construction of the rim of the wheel. Preferably the ends of the spokes are cut out on lines 5 which, in the finished wheel, are radial lines radiating from the wheel center and which are adapted to abut against the similar edges of adjoining spokes to fill out the hub part and make a practically continuous circumferential metal hub member. Also the inner edge 6 of each spoke part may be curved to follow the contour of the hub barrel and to seat on the same. The portions 7 indicate the waste material.

The blank having been cut as indicated, the two sides may evidently be drawn apart and each half may be utilized in the construction of the wheel. Preferably I utilize both parts in the formation of the same wheel, said parts being placed back to back as indicated in Fig. 4 and being properly secured together, as for instance by welding at the point indicated at 10, as well as at other parts as will be presently described.

Figures 3, 4:
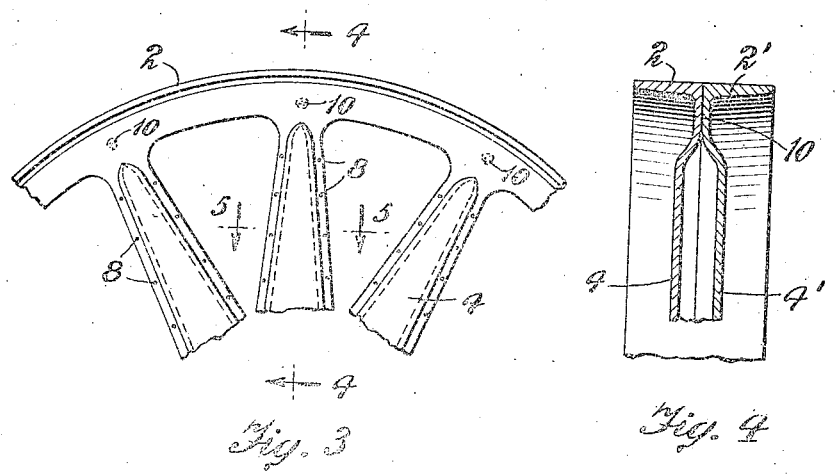
Fig. 3 is a side elevation of a portion of the complete wheel.
Fig. 4 is a cross-section on the line 4—4 Fig. 3 through the outer portion of the wheel.
Figure 5:
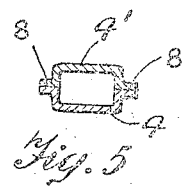
Fig. 5 is a cross-section through one of the spokes of the wheel.

Previously to assembling the parts in the relation shown in Fig. 4, each part is bent so that the edge or flange 2 or 2' will describe the circumference of a circle, which is the circumference of the rim of the wheel, the effect of so bending it being to also cause the inner ends of the spoke parts 4 to converge or become assembled in the hub portion. Each spoke of the completed wheel is preferably a tubular spoke. To produce the tubular spoke each flat portion of the floor or base of the channel bar constituting the spoke is provided with a longitudinal groove or channel formed therein by a suitable press or die, said channel or groove being the concavity on the bottom of the base or floor, so as to produce a convexity or projection upward on the inner or upper side thereof and thereby permit the assembly of the spoke parts with their edges in contact as described in the cross-section Fig. 5, and so as to make in effect the tubular spoke. The edges of the two spoke parts thus formed and assembled may be secured together at suitable points by welds or other means as indicated at the points 8.

What I claim as my invention is:—

1. A metal wheel consisting of two sections of channel bar assembled back to back and each consisting of a length of bar having its floor part or base slit to form the spokes and its edge bent to the circumference of the rim.

2. A metal wheel consisting of two sections of channel bar assembled base to base, the edges of said sections being bent to form a rim and the floor or base being cut or divided into spokes grooved and meeting by their edges to form the tubular spokes.

3. A metal wheel having rim and spokes integral and consisting of two channel bar sections assembled base to base, each said channel bar section consisting of an edge or flange of a channel bar bent to form the circumference of the rim and arranged beside one another in the completed wheel while the floor or base of each channel bar section consists of divisions of said floor constituting the spokes the inner ends of which are caused to converge in the hub part by the bending of the flanged part into the rim circumference.

4. A metal wheel consisting of two lengths of channel bar each consisting of one edge of said channel bar and divisions of the floor projecting therefrom to form the spoke parts of the wheel, said lengths being assembled and secured together base to base with the edges bent to the circumference of the rim and the spoke parts converged in the hub.

Signed at New York, in the county of New York and State of New York, this 28th day of May, A. D. 1919.

MAURICE LACHMAN.

Witnesses:
F. B. TOWNSEND,
IRENE LEFKOWITZ.